Patented Mar. 4, 1924.

1,485,380

UNITED STATES PATENT OFFICE.

WILLIAM H. ENGELS, OF RAHWAY, NEW JERSEY, ASSIGNOR TO MERCK & CO., OF NEW YORK, N. Y., A CORPORATION OF NEW YORK.

THERAPEUTIC COMPOUND AND PROCESS OF PRODUCING THE SAME.

No Drawing. Application filed September 22, 1922. Serial No. 589,931.

*To all whom it may concern:*

Be it known that I, WILLIAM H. ENGELS, a citizen of the Republic of Germany, and a resident of Rahway, in the county of Union and State of New Jersey, have invented certain new and useful Improvements in Therapeutic Compounds and Processes of Producing the Same, of which the following is a specification.

I have produced, for the first time, bismuth 8-oxyquinolate and have invented a process of producing the same of a purity compatible with therapeutic use. I have found that this compound is valuable as an antiseptic and, at the same time, has healing properties, particularly when used in the treatment of wounds.

My method of preparing the foregoing product is, briefly, as follows: I cause bismuth hydrate and 8-oxyquinoline to react with each other in a neutral or alkaline water solution. While both bismuth hydroxide and 8-oxyquinoline are substantially insoluble in water, they are sufficiently soluble to produce the desired reaction, and at a fairly rapid rate. It is not necessary, however, that either the bismuth hydrate or the oxyquinoline, or both, should be originally present as such, as they may also be used combined with acids or alkalies as salts or salt solutions, in which case the formation of the bismuth hydroxide and the oxyquinoline, or its hydroxide solution, takes place in the reaction mixture. When I refer in the claims, therefore, to 8-oxyquinoline, I intend to cover the equivalents thereof, such, for example, as the salts of 8-oxyquinoline.

To further illustrate the process by which my invention is carried out, I give the following examples:

*Example No. 1.*—26 parts bismuth hydroxide and 14.5 parts 8-oxyquinoline are mixed, by stirring, with 50 parts of water. The formation of bismuth 8-oxyquinoline begins in the cold, but the reaction is accelerated by raising the temperature of the mixture. After the reaction is completed, the product is filtered and dried at moderate heat.

*Example No. 2.*—14.5 parts 8-oxyquinoline are dissolved in 300 parts water containing 16 parts of sodium hydroxide. Into this solution is run, while stirring, a solution of 20.9 parts bismuth metal in nitric acid. When all is added the solution should still be alkaline to litmus paper. The mixture is then warmed for a short time at a temperature of preferably about 60° C. The product is recovered as in Example No. 1.

*Example No. 3.*—14.5 parts 8-oxyquinoline are dissolved in 300 parts water containing 6 parts sodium hydroxide. To this solution 29 parts bismuth subnitrate is added. The mixture is stirred, preferably at an elevated temperature (about 60°), until the reaction is completed; the product is then recovered as in Example No. 1.

*Example No. 4.*—A solution of 19.4 parts neutral oxyquinoline sulfate in 200 parts water is mixed with 29 parts bismuth subnitrate and to this a solution of 10 parts sodium hydroxide in 50 parts of water is added. The reaction is preferably completed by heating to 60° and stirring.

The bismuth 8-oxyquinoline produced in accordance with my invention and by the foregoing process is of a purity compatible with therapeutic use.

The bismuth 8-oxyquinolate produced in accordance with my invention is of a brilliant yellow color, practically insoluble in water and alkali solutions, but is decomposed by acids, even by weak acids, such as dilute acetic acid.

I ascribe to the bismuth 8-oxyquinolate the formula $Bi(OH)_2OC_9H_6N$ having the structural formula

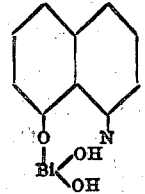

I claim:

1. The process of making bismuth 8-oxyquinolate which consists in causing bismuth hydroxide and 8-oxyquinoline to react with each other in the presence of a solvent.

2. The process of making bismuth 8-oxyquinolate which consists in causing bismuth hydroxide and 8-oxyquinoline to react with each other in presence of a solvent and at an elevated temperature.

3. The process of making bismuth 8-oxyquinolate which consists in causing bismuth hydroxide and 8-oxyquinoline to react with each other in the presence of a solvent, and at a temperature of approximately 60° C.

4. The process of making bismuth 8-oxyquinolate which consists in causing bismuth hydroxide and a solution of an 8-oxyquinoline compound to react with each other in the presence of an alkali.

5. The process of making bismuth 8-oxyquinolate which consists in causing a bismuth salt and 8-oxyquinoline to react with each other in the presence of a solution of an alkali in water.

6. The process of making bismuth 8-oxyquinolate which consists in causing a bismuth salt and a solution of an 8-oxyquinoline compound to react with each other in the presence of an alkali.

7. The process of making bismuth 8-oxyquinolate which consists in causing an acid solution of a bismuth salt and a solution of an 8-oxyquinoline compound to react with each other in the presence of an alkali.

WILLIAM H. ENGELS.